US006842451B2

(12) United States Patent
Turban

(10) Patent No.: US 6,842,451 B2
(45) Date of Patent: Jan. 11, 2005

(54) NETWORK NODE FOR SWITCHING DIGITAL INFORMATION OF DIFFERENT PROTOCOL TYPES

(75) Inventor: Karl-Albert Turban, Leonberg (DE)

(73) Assignee: Alcatel, Paris (FR)

( * ) Notice: Subject to any disclaimer, the term of this patent is extended or adjusted under 35 U.S.C. 154(b) by 958 days.

(21) Appl. No.: 09/729,776

(22) Filed: Dec. 6, 2000

(65) Prior Publication Data

US 2001/0003524 A1 Jun. 14, 2001

(30) Foreign Application Priority Data

Dec. 11, 1999 (DE) .......................................... 199 59 918

(51) Int. Cl.[7] .............................................. H04L 12/50
(52) U.S. Cl. .................................. 370/387; 370/395.52
(58) Field of Search ................................. 370/386, 387, 370/388, 389, 395.52, 395.5

(56) References Cited

U.S. PATENT DOCUMENTS 4,679,190 A * 7/1987 Dias et al. .................. 370/355
6,600,741 B1 * 7/2003 Chrin et al. ................. 370/375
6,747,971 B1 * 6/2004 Hughes et al. .............. 370/387

* cited by examiner

Primary Examiner—Wellington Chin
Assistant Examiner—Brenda Pham
(74) Attorney, Agent, or Firm—Sughrue Mion, PLLC

(57) ABSTRACT

A network node (10) for switching digital information of different protocol types is described. A plurality of modules (12-x, 13-x, 14-x) are provided which are arranged in an input stage (12), a central stage (13) and an output stage (14). Each module (12-x) of the input stage (12) is connected to each module (13-x) of the central stage (13) and each module (13-x) of the central stage (13) is connected to each module (14-x) of the output stage (14). A standard interface (15) for all protocol types is in each case provided between the input stage (12) and the central stage (13) and between the central stage (13) and the output stage (14). Each of the modules (13-x) of the central stage (13) is designed for one protocol type. The interfaces (15) comprise means for forwarding information as a function of the protocol type to a module (13-x) of the central stage (13) adapted thereto.

5 Claims, 1 Drawing Sheet

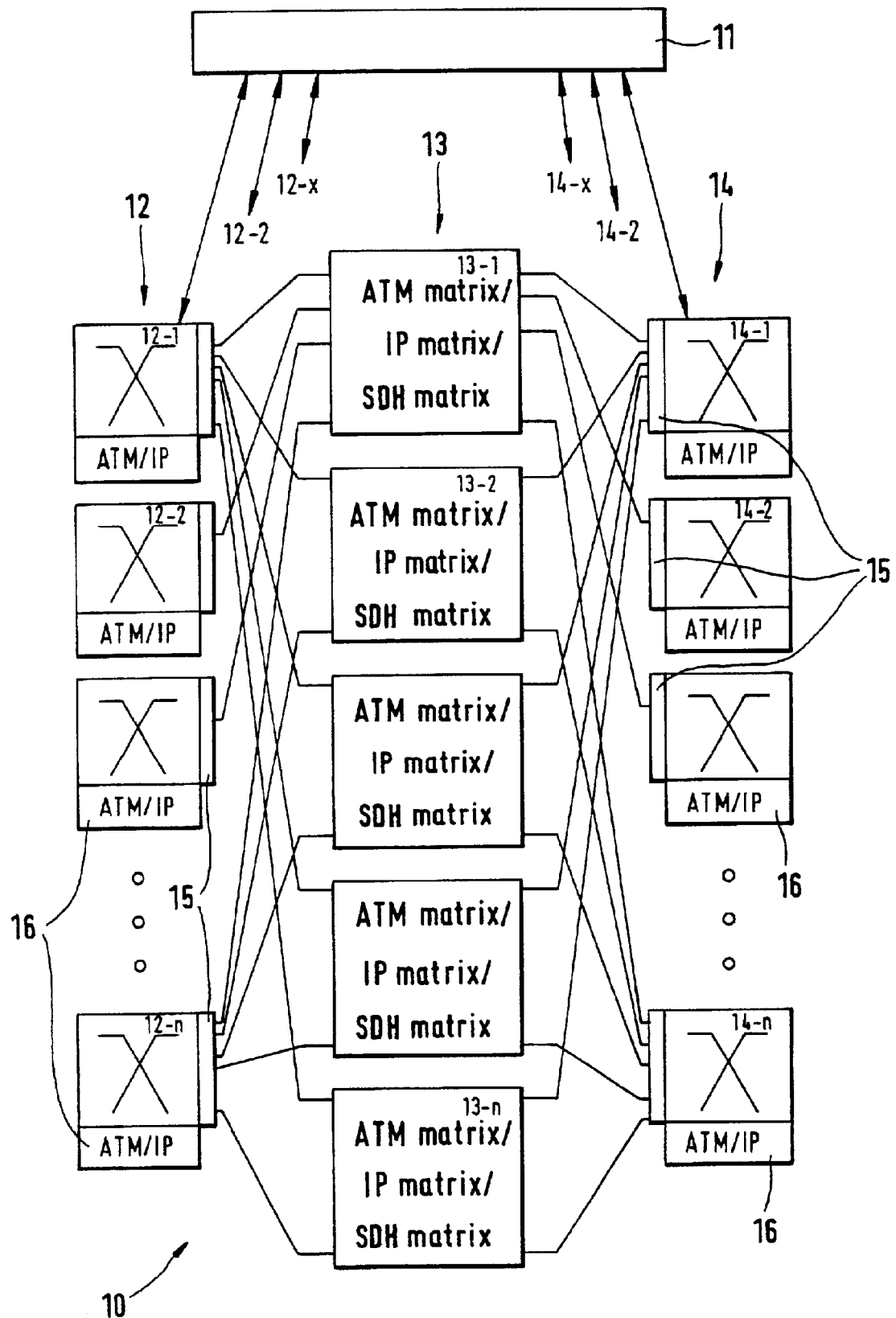

NETWORK NODE FOR SWITCHING DIGITAL INFORMATION OF DIFFERENT PROTOCOL TYPES

PRIOR ART

The invention is based on a network node for switching digital information of different protocol types with a plurality of modules which are arranged in an input stage, a central stage and an output stage, each module of the input stage being connected to each module of the central stage and each module of the central stage being connected to each module of the output stage. The invention further relates to a process for switching digital information of different protocol types wherein a corresponding network node is provided.

It is known to use a so-called SDH switching matrix (SDH=synchronous digital hierarchy) for the synchronous transmission of digital information packets. Such a SDH switching matrix comprises three stages, an input stage, a central stage and an output stage. Each stage contains a plurality of modules, each module being provided with a plurality of so-called ports for incoming or outgoing information packets. Each module of each stage is connected to each module of the adjacent stage. In this way incoming information can be forwarded from each of the modules of the input stage to each of the modules of the output stage.

It is likewise known to switch information in the form of ATM or IP packets (ATM=asynchronous transfer mode, IP=internet protocol) in a SDH switching matrix as aggregated packet stream. The individual switching of individual information packets takes place not in the SDH network nodes but in downstream devices, e.g. in so-called ATM switches or IP routers. The hardware outlay and resultant costs are clearly high.

OBJECT AND ADVANTAGES OF THE INVENTION

The object of the invention is to provide a network node for switching digital information of different protocol types which requires a low hardware outlay and thus lower costs.

This object is achieved in a network node of the type referred to in the introduction in accordance with the invention in that a standard interface is in each case provided between the input stage and the central stage and between the central stage and the output stage, that each of the modules of the central stage is adapted to one of the different protocol types, and that the interfaces comprise means for forwarding an information packet as a function of its protocol type to a module of the central stage adapted thereto. The object is achieved in a corresponding manner according to the invention in a process of the type referred to in the introduction.

The invention provides a structure of a network node which enables information represented in different protocol types to be switched directly and without external or additional devices. The structure comprises three stages and consists of modules for the input stage, the central stage and the output stage. Each module of the input stage is connected to each module of the central stage and likewise each module of the central stage is connected to each module of the output stage.

The standard interfaces arranged, in accordance with the invention, between the stages offer the possibility of accommodating modules for different protocol types in the central stage. It is thus no longer necessary to connect additional ATM switches or IP routers to a SDH switching matrix for the switching of ATM or IP traffic, it being possible to accommodate an ATM or IP matrix directly in the central stage.

As a result of the standard interfaces, the modules of the central stage have a standard connection to the exterior, so that they are no longer tied to a specific protocol type. It is thus possible to provide modules of different protocol types in the central stage so that not only SDH traffic, but also ATM traffic or IP traffic can be switched via the associated modules of the central stage.

In accordance with the invention it is no longer necessary to switch the ATM traffic in a plurality of stages firstly via a SDH switching matrix and then via an ATM switch. Instead, in accordance with the invention, the ATM traffic can be switched directly via a corresponding ATM matrix in the central stage.

The hardware outlay is thus clearly considerably lower than previously.

In operation the modules of the input stage recognise the protocol type to which the information in each case to be transmitted belongs. As a function of the protocol type, the information is then forwarded to a module of the central stage likewise belonging to this protocol type. In this way, in addition to SDH information streams, ATM and IP packets can also immediately be further processed by the associated module without the need for the ATM or IP packets to leave the SDH switching matrix as was previously the case. This advantage also exists in the event of the mixed occurrence of containers with information of different protocol types in a STM structure (STM=synchronous transport module).

A further advantage of the invention consists in that the SDH traffic is no longer blocked by ATM or IP traffic, as was previously the case. Instead, a separate, in each case associated module in the form of a SDH matrix and/or an ATM matrix and/or an IP matrix is available for each protocol type. This constitutes an essential advantage of the invention in respect of the transmission rate and transmission speed of the network node according to the invention.

A further advantage of the invention consists in the possibility of being able to upgrade or expand the network node according to the invention at any time and in a completely flexible manner. For this purpose it is only necessary to add the desired additional modules. As a result of the standard interfaces according to the invention, any desired modules for SDH traffic or for ATM traffic or for IP traffic can be added in the central stage. This advantage also manifests in a lower hardware outlay and consequently lower costs.

It is particularly advantageous if the modules of the central stage are exchangeable. It is thus possible for a module of a specific protocol type to be subsequently exchanged for another module of a different protocol type. As a result of the standard interfaces according to the invention, this can take place at any time and again in a fully flexible manner even during operation. The network node according to the invention thus not only can be flexibly expanded but a modification of the network node is also readily possible at any time.

The above mentioned possibilities of flexible expansion and modification of the network node according to the invention result in the further advantage of the invention that the network node is scalable. Simply by means of appropriate additional or exchanged modules, the network node according to the invention can be expanded or modified according to requirements.

A further advantage of the invention consists in the uniformity of components. In particular, the use of the standard interfaces according to the invention facilitates the production thereof in large numbers. This constitutes a further reduction in the development and production costs of the network node according to the invention.

The invention also offers the possibility of installing the network node decentrally. This results in increased reliability with reduced outlay.

Further features, application possibilities and advantages of the invention will be described in the following description of exemplary embodiments of the invention illustrated in the drawing. Here all the described or illustrated features, both independently and in arbitrary combinations, form the subject of the invention irrespective of their combination in the claims or their dependencies and irrespective of their wording in the description and representation in the drawing.

BRIEF DESCRIPTION OF THE DRAWINGS

The sole FIGURE of the drawing is a schematic block circuit diagram of an exemplary embodiment of a network node according to the invention.

DETAILED DESCRIPTION OF THE INVENTION

The FIGURE shows a network node 10 having three stages, an input stage 12, a central stage 13 and an output stage 14. The input stage 12 is provided with a plurality of modules 12-1, 12-2, ..., 12-n, the central stage 13 with a plurality of modules 13-1, 13-2, ..., 13-n and the output stage 14 with a plurality of modules 14-1, 14-2, ..., 14-n. The modules of the individual stages will be designated by the reference symbols 12-x, 13-x and 14-x in the following for simplification.

Each of the modules 12-x of the input stage 12 is connected to each module 13-x of the central stage 13. Likewise each of the modules 13-x of the central stage 13 is connected to each of the modules 14-x of the output stage 14.

Each of the modules 12-x of the input stage 12 is provided at its input end with a plurality of ports at which digital information is received. Each of the modules 14-x of the output stage 14 is provided at its output end with a plurality of ports at which digital information is output.

Each of the modules 13-x of the central stage 13 is designed for one single specific protocol type. Thus each of the modules 13-x of the central stage 13 can be adapted to the SDH protocol or the ATM protocol or the IP protocol. The modules 13-x of the central stage 13 can thus contain a SDH matrix or an ATM matrix or an IP matrix. The modules 13-x of the central stage 13 can thus switch SDH traffic or ATM traffic or IP traffic depending upon the provided protocol type.

Standard interfaces 15 in the form of assemblies are provided between the modules 13-x of the central stage 13 and the modules 12-x and 14-x of the input stage 12 and the output stage 14. These interfaces 15 have been represented in the FIGURE in each case for the modules 12-x and 14-x of the input stage 12 and of the output stage 14. However it is also necessary for the interfaces 15 in each case also to be provided in the modules 13-x of the central stage 13. These last mentioned interfaces 15 have not been represented in the FIGURE for reasons of clarity.

The interfaces 15 can likewise be provided, independently of the modules, as separate interface adapters between the input stage 12 and the central stage 13 and between the central stage 13 and the output stage 14.

As a result of the standard interfaces 15, each of the modules 13-x of the central stage 13 has a uniform connection to the exterior, thus in the direction of the modules 12-x and 14-x of the input stage 12 and the output stage 14. Each of the modules 13-x of the central stage 13 can therefore be exchanged for another module with a different protocol type. In this way, in the central stage 13 it is possible for example for a module with a SDH matrix to be exchanged for a module with an IP matrix.

The interfaces 15, provided as assemblies, are equipped with means for informing one another of the protocol type of the transmitted information. The interfaces 15 are also provided with means for determining the protocol type of the connected modules 13-x of the central stage 13. It is thus possible for the interfaces 15 between the input stage 12 and the central stage 13 to forward information of a specific protocol type to a module 13-x of the central stage 13 with the same protocol type.

Each of the modules 12-x and 14-x of the input stage 12 and of the output stage 14 is equipped with an ATM/IP matrix 16. This ATM/IP matrix 16 is provided for switching information packets according to the ATM protocol or the IP protocol.

If information in the form of virtual containers having a synchronous content according to the SDH protocol is received by one of the modules 12-x of the input stage 12, this information is forwarded via the associated interface 15 to a corresponding module 13-x of the central stage 13 which has a SDH matrix. The information is forwarded from this module 13-x of the central stage 13 and reaches an interface 15 belonging to one of the modules 14-x of the output stage 14. The information is processed again by this interface 15 whereupon it is output via the associated module 14-x of the output stage 14.

If a packet according to the ATM protocol is received by one of the modules 12-x of the input stage 12, this packet is firstly conditioned by the ATM/IP matrix 16 of the module 12-x. Then the packet is forwarded from the associated interface 15 to an appropriate one of the modules 13-x of the central stage 13 with an ATM matrix. The packet is forwarded from this module 13-x of the central stage 13 and reaches an interface 15 belonging to one of the modules 14-x of the output stage 14. The packet is processed again by this interface 15 whereupon it is output via the associated module 14-x of the output stage 14 and the ATM/IP matrix 16 thereof.

The process described in the foregoing for a packet according to the ATM protocol applies in a corresponding manner to a packet according to the IP protocol. However, in place of an ATM matrix, a module 13-x in the central stage 13 with an IP matrix is used.

As shown in the FIGURE, a control system 11 is provided for the network node 10. The control system 11 has links to the modules 12-x of the input stage 12 and to the modules 14-x of the output stage 14. The modules 13-x of the central stage 13 are controlled via the interfaces 15.

These modules 13-x likewise report their status upon request via the interfaces 15 to the modules 14-x of the output stage 14. From here this status is then forwarded to the control system 11.

The setting up of so-called routing tables takes place from the modules 12-x of the input stage 12 via the interfaces 15. Test data are likewise sent from the modules 12-x of the input stage 12 to the modules 14-x of the output stage 14.

These modules 14-x are supplied by the control system 11 with the information required for testing the test data. If the test data are correctly received by the modules 14-x of the output stage 14, the connection is considered as having been correctly set up.

If the interfaces 15 are provided in the form of interface adapters between the input stage 12 and the central stage 13 and between the central stage 13 and the output stage 14, the control system 11 is connected not to the modules 12-x and 14-x of the input stage 12 and of the output stage 14 but only to the modules 13-x of the central stage 13. The modules 13-x then are directly controlled by the control system 11.

The technology used for interconnecting the interfaces 15 in the form of assemblies decides whether the network node must be installed centrally in a building or can be installed decentrally. Decentral installation increases the reliability.

What is claimed is:

1. A network node (10) for switching digital information of different protocol types with a plurality of modules (12-x, 13-x, 14-x) which are arranged in an input stage (12), a central stage (13) and an output stage (14), each module (12-x) of the input stage (12) being connected to each module (13-x) of the central stage (13) and each module (13-x) of the central stage (13) being connected to each module (14-x) of the output stage (14), characterised in that a uniform interface (15) for all protocol types is provided between the input stage (12) and the central stage (13) and between the central stage (13) and the output stage (14), that each of the modules (13-x) of the central stage (13) is designed for one protocol type, and that the interfaces (15) comprise means for forwarding information as a function of the protocol type to a module (13-x) of the central stage (13) adapted thereto.

2. A network node (10) according to claim 1, characterised in that the modules (13-x) of the central stage (13) are replaceable.

3. A network node (10) according to claim 1, characterised in that the modules (12-x, 14-x) of the input stages (12) and of the output stages (14) are adapted to a plurality of, or all of, the different protocol types.

4. A network node (10) according to claim 1, characterised in that the network node (10) is a distributed node.

5. A process for switching digital information of different protocol types, wherein a network node (10) is provided with a plurality of modules (12-x, 13-x, 14-x) which are arranged in an input stage (12), a central stage (13) and an output stage (14), each module (12-x) of the input stage (12) being connected to each module (13-x) of the central stage (13) and each module (13-x) of the central stage (13) being connected to each module (14-x) of the output stage (14), characterised in that a uniform interface (15) for all protocol types is provided between the input stage (12) and the central stage (13) and between the central stage (13) and the output stage (14), that each of the modules (13-x) of the central stage (13) is designed for one protocol type, and that information is forwarded from the interfaces (15) as a function of the protocol type to a module (13-x) of the central stage (13) adapted thereto.

* * * * *